(12) United States Patent
Hänsel et al.

(10) Patent No.: US 8,443,859 B2
(45) Date of Patent: May 21, 2013

(54) BONDING TOOL FOR ATTACHING PREPARED ADHESIVE TO BONDING PART

(75) Inventors: Mathias Hänsel, Rümmingen (DE);
Herbert Le Pabic, Colmar (FR);
Frederic Laure, Gomez la Ville (FR);
Olivier Daverio, Folgensburg (FR)

(73) Assignee: A. Raybond et Cie, Grenoble (FR)

( * ) Notice: Subject to any disclaimer, the term of this patent is extended or adjusted under 35 U.S.C. 154(b) by 117 days.

(21) Appl. No.: 12/885,448

(22) Filed: Sep. 18, 2010

(65) Prior Publication Data
US 2012/0067497 A1 Mar. 22, 2012

(51) Int. Cl.
*B29C 65/02* (2006.01)
*B65H 29/02* (2006.01)

(52) U.S. Cl.
USPC ........... 156/499; 156/556; 156/564; 156/565; 156/309.9

(58) Field of Classification Search ............... 156/309.9, 156/499, 556, 564, 565
See application file for complete search history.

(56) References Cited

U.S. PATENT DOCUMENTS

| | | | | |
|---|---|---|---|---|
| 3,895,984 A * | 7/1975 | Cone et al. | | 156/79 |
| 4,088,870 A * | 5/1978 | Warner | | 392/368 |
| 4,477,219 A * | 10/1984 | Sauder | | 414/798.1 |
| 4,715,631 A * | 12/1987 | Nakajima | | 294/2 |
| 5,750,156 A * | 5/1998 | Maus et al. | | 425/139 |
| 6,221,197 B1 * | 4/2001 | Mori et al. | | 156/308.6 |
| 7,422,398 B2 * | 9/2008 | Wirtanen et al. | | 409/143 |
| 2007/0261777 A1 * | 11/2007 | Steckelberg et al. | | 156/72 |
| 2008/0063323 A1 * | 3/2008 | Chevilliard | | 383/113 |

* cited by examiner

*Primary Examiner* — Katarzyna Wyrozebski Lee
*Assistant Examiner* — Scott W Dodds
(74) *Attorney, Agent, or Firm* — Shook Hardy & Bacon LLP

(57) ABSTRACT

A manually operated or automated bonding tool for the attachment of a formed adhesive element to a bonding part is disclosed. The bonding tool includes a loading module in which the bare bonding part is loaded, an oven module in which the bare bonding part is heated, an adhesive picking station module in which the adhesive is attached to the heated bare bonding part, and a part transfer module which advances the bare bonding part sequentially from the loading module, through the oven module, and to the adhesive picking station module. The oven module includes an elongated heating block having a bonding part guide by which the bare bonding parts are transferred through the oven and to the adhesive picking station module. The part transfer module is used to push the unheated bare bonding part into and through the oven module and into position on the adhesive picking station module.

25 Claims, 22 Drawing Sheets

BONDING TOOL FOR ATTACHING PREPARED ADHESIVE TO BONDING PART

TECHNICAL FIELD

The disclosed invention relates generally to the preparation of bonding parts attachable to a glass surface or other substrate through the use of adhesives. More particularly, the disclosed invention relates to an automated or manually operated bonding tool for attaching a prepared adhesive, such as a structural polyurethane, epoxy or other basic for an adhesive, pressed from a powder to an adhesive tablet, to a bonding part made of any one of several materials including metal, glass, ceramic, plastic, wood and composites for attachment to another component such as a glass surface or to another substrate made of materials such metal, ceramic, plastic, wood and composites.

BACKGROUND OF THE INVENTION

Attachment of a first component to a second component for any of a variety of applications may be made by any of several known methods of fastening, including mechanical or chemical fastening. Mechanical fastening, while often practical and reliable, is not always usable for every application. For example, where a first component is being attached to a second component and it is not desirable or practical to drill into or otherwise modify the second component for mechanical attachment, chemical fastening is the only other alternative. This is the case where, for example, a component is to be attached to a glass surface or other substrate (the second component). An example of a component-to-glass arrangement may be seen in the automotive industry where a rear view mirror or a metal hinge needs to be attached to a glass surface. Other examples of component-to-glass attachment requirements exist such as in both home and office construction.

A solution to the bonding challenge was introduced in the form of an adhesive applied between the part to be attached (the bonding part) and the substrate to which the bonding part was attached. The adhesives have been applied in several ways. According to one known approach the adhesive is applied to the bonding part by dosing with nozzles and spraying the adhesive onto the bonding part. While this process can be easy and often inexpensive, it suffers from the need to frequently clean the nozzles in order to maintain a desired level of consistency in the actual spraying from part to part. The sprayed adhesive also tends to be sticky, thus resulting in the possibility that the bonding part will come into contact with another object between the time of the spraying of the adhesive and the actual attachment of the bonding part to the substrate.

According to another known approach a double-sided tape is applied to the bonding part. According to this approach a release layer is removed from one side of the tape and the tape is applied to the bonding part. While the release layer protects against the adhesive from being inadvertently attached to a surface, it also adds an inconvenient step in the process of attachment of the bonding part to the substrate in that the layer must be removed prior to attachment. The release layer may also tear resulting in a portion of the layer being left behind on the adhesive surface and creating the potential for imperfect adhesion of the bonding part to the substrate.

In addition, hot melt guns have been used to melt an adhesive (in the form of an adhesive stick) for bonding to the bonding part. While the use of hot melt guns is relatively easy, only non-structural adhesives can be used, thus this approach has its limitations.

A more attractive method is to provide the bonding part with a formed adhesive element such as a tablet already in position prior to shipment of the bonding part to the end-user. This arrangement is attractive as it results in a bonding part that is ready to bond with no requirement that the end user attach the adhesive tablet to the bonding part. However, it is often the case that the end user wishes to apply the tablet at its facility and according to its own schedule and arrangement. In such a case the concept of a pre-applied adhesive such as the bonding tablet already fitted to the bonding part may not be the optimal choice. In the event that the user wishes to apply the adhesive to the bonding part at its facility an on-site bonding machine may be used. However, known bonding machines can be complex to operate and expensive to own and maintain, with such ownership often being justified only by those users having high part volumes.

Accordingly, as in so many areas of fastener technology, there is room in the art of bonding parts for a practical, easy to use and relatively inexpensive tool for bonding an adhesive to a bonding part.

SUMMARY OF THE INVENTION

The disclosed invention provides a bonding tool for the attachment of a formed adhesive element to a bonding part in a practical, relatively simple and cost-effective way. The bonding tool of the disclosed invention may be entirely automated through, for example, pneumatic or electrical automation, may be entirely automatically operated, or may be a combination of automated and manual operations.

The bonding tool of the disclosed invention includes a loading module in which the bare bonding part is loaded, an oven module in which the bare bonding part is heated, an adhesive picking station module in which the adhesive is attached to the heated bare bonding part, and a part transfer module which advances the bare bonding part sequentially from the loading module, through the oven module, and to the adhesive picking station module. The bonding parts may be advanced or fed through the system either manually, via automation or through a combination of the two. The modules are mounted on a base plate. Optionally but desirably the modules are protected by strategically placed cover sections.

The loading module includes a body having a base block and a support block. The support block includes a bare bonding part-retaining aperture formed in its top and an adjacent finger notch. A heat shield is attached to the side of the loading module adjacent the oven module. The bare bonding part is initially placed in the bare bonding part-retaining aperture.

The oven module is positioned next to the loading module. It receives an unheated bare bonding part from the loading module. The oven module includes an elongated heating block and a heat cover positioned substantially over the heating block. A bonding part guide is formed along the length of the elongated heating block. A plurality of bare bonding parts can be positioned in the bonding part guide at a single time, thus allowing for an unheated, incoming bare bonding part to be heated to an appropriate temperature prior to exiting the oven module.

The part transfer module includes a reciprocating body slidably attached to a guide base fixed to a guide rail on the base plate. A transport finger assembly is fixed to the reciprocating body. A handle is fixed to the upper side of the reciprocating body. A first transfer finger assembly includes a transfer finger movable substantially through the finger notch of the loading module for advancing the unheated bare bonding part from the loading module into the oven module. The part transfer module further includes a second transfer finger movably attached to the transport finger assembly. Movement along a movable flap pivotably attached to a flap base fixed to the guide base causes the second transfer finger to be selectively moved between a heated bare bonding part contacting position and pushing position and a non-contacting position.

The adhesive picking station module is positioned next to the oven module. It receives a heated bare bonding part from the oven module. The adhesive picking station module includes a cartridge for receiving, holding and feeding the formed adhesive element, typically in the form of an adhesive tablet. The adhesive picking station module also includes a slide and a stamp element. The slide advances a single adhesive tablet from the cartridge into position over the stamp element. Thereafter the heated bare bonding part is advanced over the adhesive tablet. The tablet may be advanced or fed through the system either manually, via automation or through a combination of the two.

A hand-held applicator is positioned over the bare bonding part and is pressed into contact with the adhesive tablet and is moved until the stamp element halts forward motion of the combined adhesive tablet and bonding part. The bonding part (and the now-attached adhesive element) is retained by the applicator until moved into position for attachment to the selected substrate.

The disclosed invention provides a low-cost and efficient solution to the challenge faced by the user of adhesive-picked bonding parts who uses a smaller number of bonding parts. The oven module provides consistency of heating temperature to the bare bonding part and thus bonding consistency. According to the disclosed method, even if the continuous bonding cycle is interrupted, no bare bonding part will be overheated. The bare bonding part used for the adhesive attachment (the part which exits the oven) always has the same temperature as the adjusted oven temperature. The first-in-first-out method of heating the bare bonding parts helps to provide part temperature consistency as well.

Other advantages and features of the invention will become apparent when viewed in light of the detailed description of the preferred embodiment when taken in conjunction with the attached drawings and the appended claims.

BRIEF DESCRIPTION OF THE DRAWINGS

For a more complete understanding of this invention, reference should now be made to the embodiments illustrated in greater detail in the accompanying drawings and described below by way of examples of the invention wherein.

DETAILED DESCRIPTION OF THE PREFERRED EMBODIMENT

Figure 1:
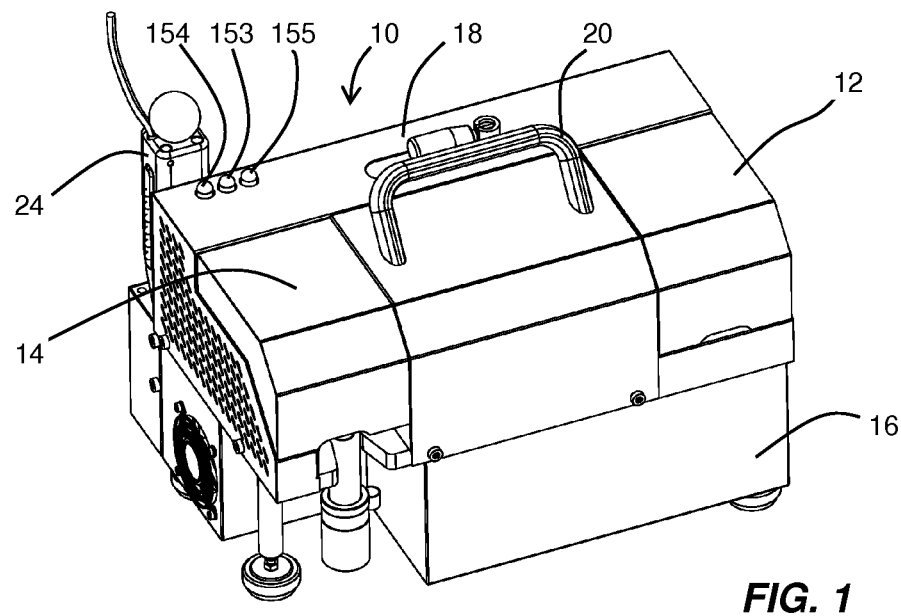
FIG. 1 is a perspective view of the bonding tool of the disclosed invention shown with all of its protective covers in place.

In the following figures, the same reference numerals will be used to refer to the same components. In the following description, various operating parameters and components are described for different constructed embodiments. These specific parameters and components are included as examples and are not meant to be limiting.

FIGS. 1 through 4 generally show the bonding tool of the disclosed invention, generally illustrated as 10. It is to be understood that the shape and general appearance of the bonding tool 10 as illustrated is only suggested and is not intended as being limiting as the bonding tool 10 may adopt other shapes and sizes without deviating from the spirit and scope of the invention as described.

The bonding tool 10 optionally but preferably includes one or more removable protective covers including, for example, a removable loading station module protective cover 12 and a removable adhesive picking station module protective cover 14. The protective covers 12 and 14 are provided to protect certain parts of the bonding tool 10 from dust, dirt and other forms of damage during shipment and storage. The bonding tool 10 also includes a base cover 16 for housing the electrical components and control elements and a main bonding tool cover 18 having a carrying handle 20. The removable loading station module protective cover 12 and a removable adhesive picking station module protective cover 14 are secondary to the main bonding tool cover 18 which ordinarily stays in its attached position as illustrated in FIGS. 1 and 2 during operation.

An applicator 24 for grasping a bare bonding part, pressing it against the adhesive tablet for adhesion, removing the bonding part fixed with the adhesive tablet, and applying the bonding part to the selected substrate is provided and may or may not be a fixed part of the bonding tool 10. As illustrated in FIGS. 1 and 2 the applicator 24 is removably inserted on the bonding tool 10. The applicator 24 and its function will be discussed below with respect to FIGS. 21 through 25.

Figure 2:
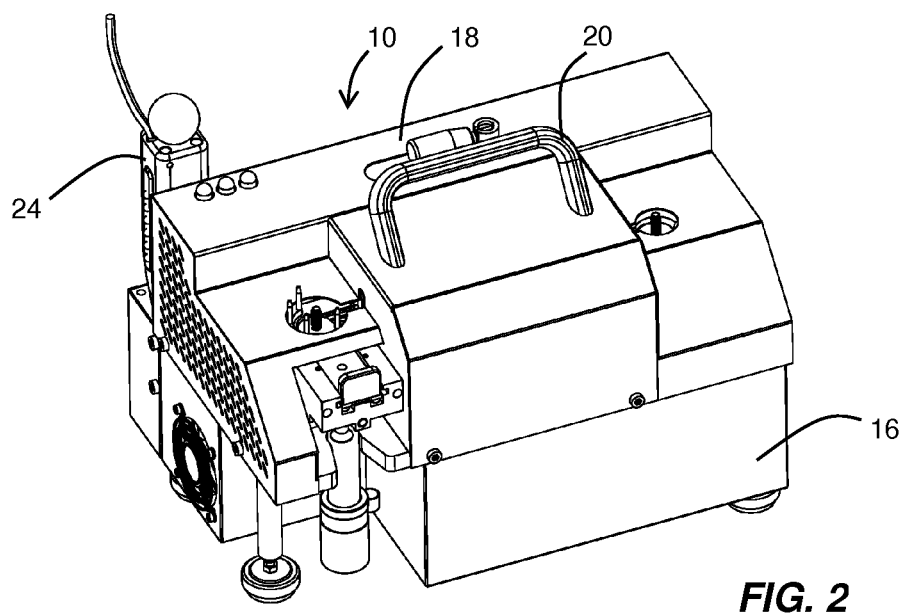
FIG. 2 is a view similar to that of FIG. 1 but showing the bonding tool without the removable loading station module protective cover and the removable adhesive picking station module protective cover.

When in use, and as illustrated in FIG. 2, the removable loading station module protective cover 12 and a removable adhesive picking station module protective cover 14 are removed for operation.

Figure 3:
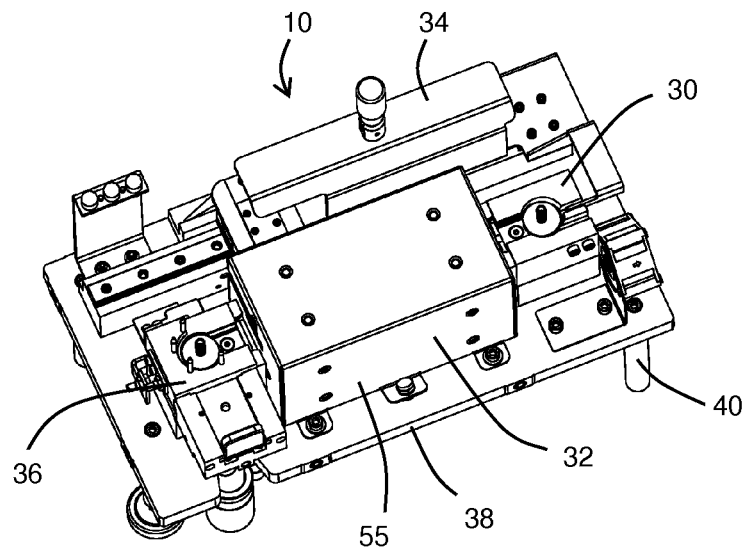
FIG. 3 is perspective view of the bonding tool of the disclosed invention with all of the covers removed taken from a first side.
Figure 4:
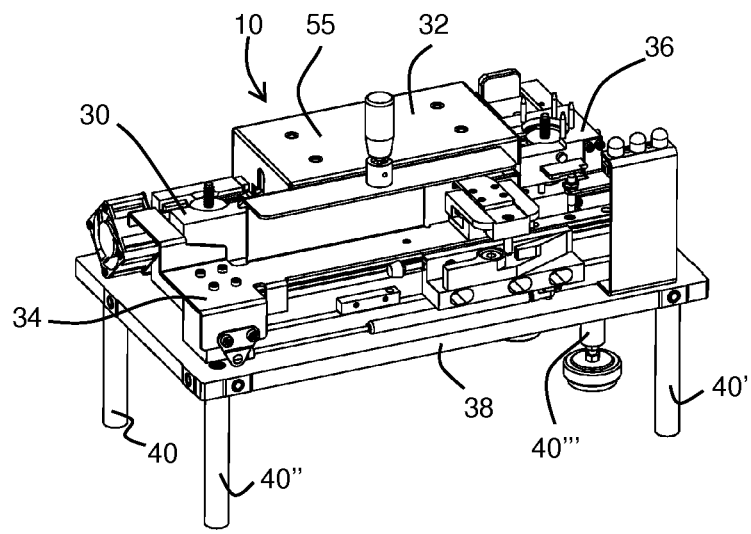
FIG. 4 is perspective view of the bonding tool of the disclosed invention with all of the covers removed taken from a second side.

FIGS. 3 and 4 illustrate the bonding tool 10 with all of the covers 12, 14, 16 and 18 removed. Under normal operating circumstances the bonding tool 10 would not be used in this way. The covers 12 and 14 would be removed as set forth above for operation. However, the covers 16 and 18 would normally remain in place during operation. For purposes of the present description, the covers have been removed in FIGS. 3 and 4 in which FIG. 3 illustrates a perspective view of a first side of the bonding tool 10 and FIG. 4 illustrates a perspective view of a second side of the bonding tool 10.

The bonding tool 10 includes four basic operating modules. These include a loading station module 30, an oven module 32, a part slide module 34, and a adhesive picking station module 36. Each of the modules 30, 32, 34 and 36 will be discussed below individually. The modules 30, 32, 34 and 36 are attached directly or indirectly to base plate 38. Legs 40, 40', 40" and 40'" are fitted to the underside of the base plate 38.

Loading Station Module

Figure 5:
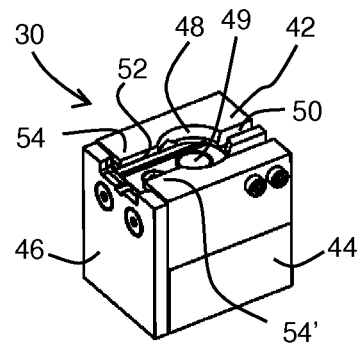
FIG. 5 is a perspective view of the loading station module.

The loading station module 30 is illustrated in detail in FIG. 5. The loading station module 30 includes a support block 42 fitted to a basic block 44. The basic block 44 is attached to the base plate 38. A thermo-protective heat shield 46 is fitted to the side of the loading station module 30 that faces the oven module 32. The heat shield 46 may be composed of any known material suitable for restricting the passage of heat to the loading station module 30.

Formed in the top side of the support block 42 is a circular receiver 48 for receiving the base of a bare bonding part (not shown). A magnet 49 is fitted in the base of the circular receiver 48. A finger notch 50 is also formed in the top side of the support block 42 as is a bare bonding part channel 52. The bare bonding part channel 52 includes a pair of opposed and spaced apart upper flanges 54 and 54'. After being positioned in the circular receiver 48 the bare bonding part is pushed out of the loading station module 30 by the part slide module 34. As it is pushed out of the loading station module the base of the bare bonding part passes through the bare bonding part channel 52 and into the oven module 32. The upper flanges 54 and 54' prevent the base of the bare bonding part from tipping out of the channel 52 during movement from the circular receiver 48 and into the oven module 32.

Oven Module

The oven module 32 is illustrated in FIGS. 3 and 4. In these figures an oven module cover 55 is shown. Inside the oven module 32 is a heating block 56 illustrated in FIG. 6. the oven module cover 55 retains heat generated by the heating block 56.

Figure 6:
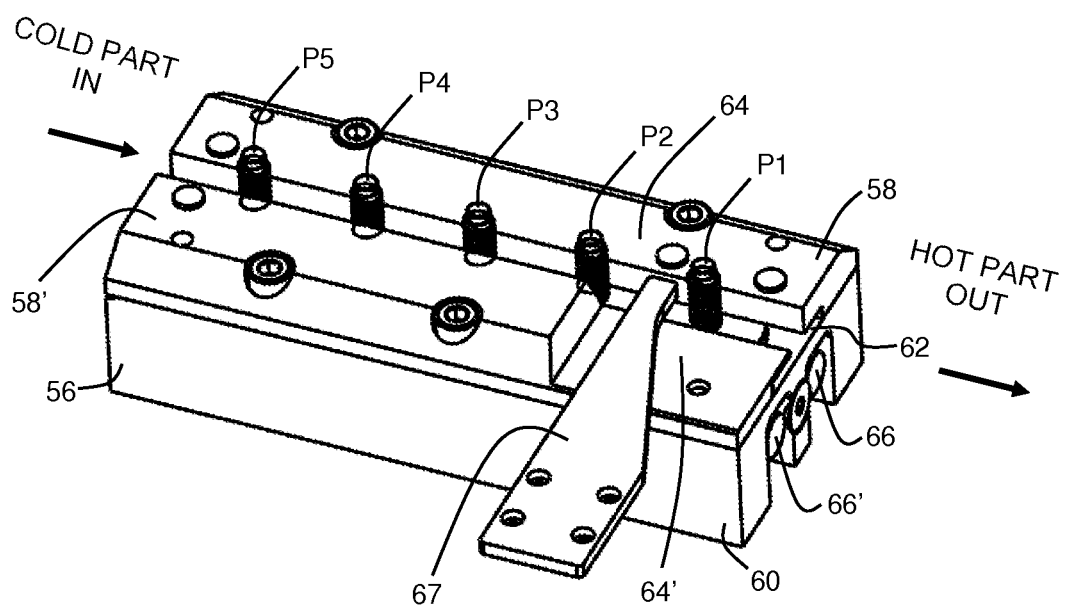
FIG. 6 is a perspective view of the heating block of the oven module loaded with a plurality of bare bonding parts and the second transfer finger of the part slide module.

With reference to FIG. 6, the heating block 56 includes support blocks 58 and 58' fitted to a basic block 60. A bare bonding part channel 62 is formed between the support block 58 and the basic block 60. A pair of spaced apart and opposed upper part guide flanges 64 and 64' are support block 58. The heating elements 66 and 66' provide a pre-selected and constant amount of heat to the heating block 56.

The bare bonding part channel 62 allows bare bonding parts received from the loading station module 30 to pass through and along the heating block 56 to the adhesive picking station module 36. As illustrated from this view, the cold parts enter on the left side and hot parts exit on the right side. A plurality of bare bonding parts $P_1 \ldots P_5$ is illustrated at various positions along the bare bonding part channel 62. The upper part guide flanges 64 and 64' provide the part channel and prevent the bases of the bare bonding parts $P_1 \ldots P_5$ from tipping out of the channel 62 during movement from the loading station module 30 into the adhesive picking station module 36. Before initiating the operation the oven module 32 has to be filled with a specific amount of parts such that one hot part moves out of the oven module 32 at the same time one cold part is moved into the oven module 32.

The bare bonding parts $P_1 \ldots P_5$ are moved along the bare bonding part channel 62 and are heated to a pre-selected temperature while dwelling in the heating block 56. In this instance, the first bare bonding part pushed into the channel 62 of the heating block 56 (in the illustrated case, bare bonding part $P_1$) is the first to be pushed out of the channel 62 and into the adhesive picking station module 36. At the other end of the channel 62 the last bare bonding part pushed into the channel 62 (in the illustrated case, bare bonding part $P_5$) is the last to be pushed out of the channel 62 and into the adhesive picking station module 36 by means of a hot part transfer finger 67, described below with respect to the Part Slide Module. While five bare bonding parts are illustrated as being in line and retained in the channel 62 it is to be understood that a greater or lesser number of bare bonding parts may be positioned therein.

Part Slide Module

Figure 7:
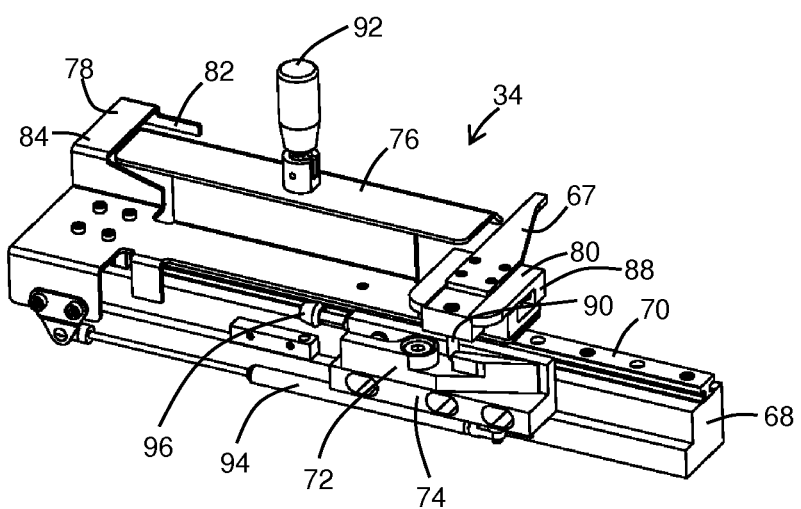
FIG. 7 is a perspective view of the part slide module of the disclosed invention.

Movement of the bare bonding part from the loading station module 30, through the oven module 32, and to the adhesive picking station module 36 is accomplished by operation of the part slide module 34. The part slide module 34 is illustrated in FIG. 7. The part slide module 34 includes a guide base 68 fixedly attached to the base plate 38. A guide rail 70 is fixed to the guide base 68. To the side of the guide base 68 is a flap cam control 72 pivotably mounted to flap base 74. The flap base 74 is attached to the guide base 68.

A reciprocating body 76 is slidably attached to the guide rail 70 of the guide base 68. The reciprocating body 76 includes a first transfer finger assembly 78 and a second transfer finger assembly 80. The first transfer finger assembly 78 moves the unheated bare bonding part from the loading station module 30 into and through the oven module 32 by pushing one bare bonding part against an adjacent bare bonding part. The second finger transfer assembly 80 moves a heated bare bonding part from the oven module 32 and to the adhesive picking station module 36.

The first transfer finger assembly 78 includes a cold part transfer finger 82. The cold part transfer finger 82 is reciprocatingly fitted into the finger notch 50 of the top side of the support block 42 of the loading station module 30. The cold part transfer finger 82 is an extension of an arm 84 that extends from the reciprocating body 76.

The second transfer finger assembly 80 includes the hot part transfer finger 67 that is attached to a reciprocating finger support 88. The reciprocating finger support 88 is reciprocatingly movable in a direction transverse to the long axis of the guide rail 70 of the guide base 68. A guide pin 90 extends from the underside of the reciprocating finger support 88 for interaction with the flap cam control 72 as will be described below.

A folding handle 92 is attached to the reciprocating body 76 for the movement of the reciprocating body 76 as selected back and forth along the guide rail 70. A gas spring 94 is provided to assist in the reciprocating movement. One end of the gas spring 94 is attached to the guide base 68. The other end of the gas spring 94 is attached to the reciprocating body 76. Forward movement of the reciprocating body 76 on the guide rail 70 is limited by a reciprocating body stop 96.

Once an unheated bare bonding part is inserted into the circular receiver 48 of the loading station module 30 movement of the reciprocating body 76 and the associated first transfer finger assembly 78 and the second transfer finger assembly 80 is accomplished by the operator grasping the folding handle 92. When the reciprocating body 76 is moved toward the adhesive picking station module 36 the cold part transfer finger 82 contacts the unheated bare bonding part that is moved out of the loading station module 30 and into the oven module 32.

Simultaneously, the second transfer finger assembly 80 moves the hot bonding part $P_1$ out of the oven module 32 and into the adhesive picking station module 36 in conjunction with the flap cam control 72 as set forth in stage-wise progress in FIGS. 8 through 16.

Figure 8:
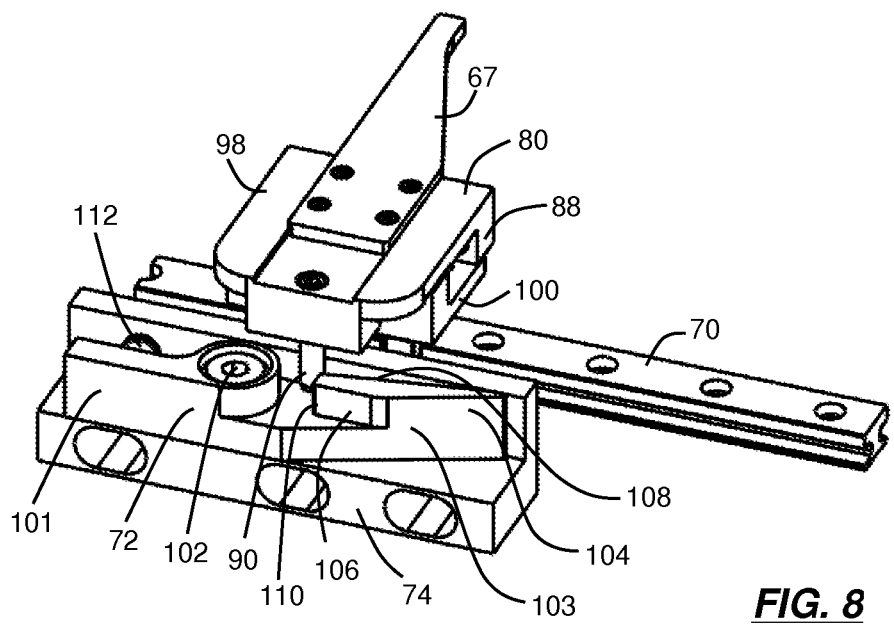
FIG. 8 is a perspective view of the second transfer finger assembly and the flap cam control illustrating the second transfer finger assembly in its home position.
Figure 9:
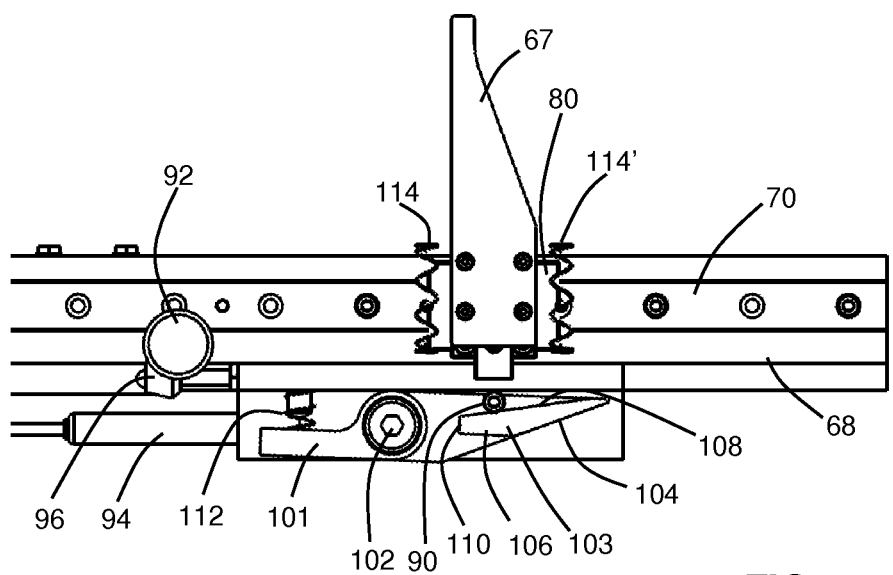
FIG. 9 is a plan view of the second transfer finger assembly in a position advanced from its position shown in FIG. 8.
Figure 10:
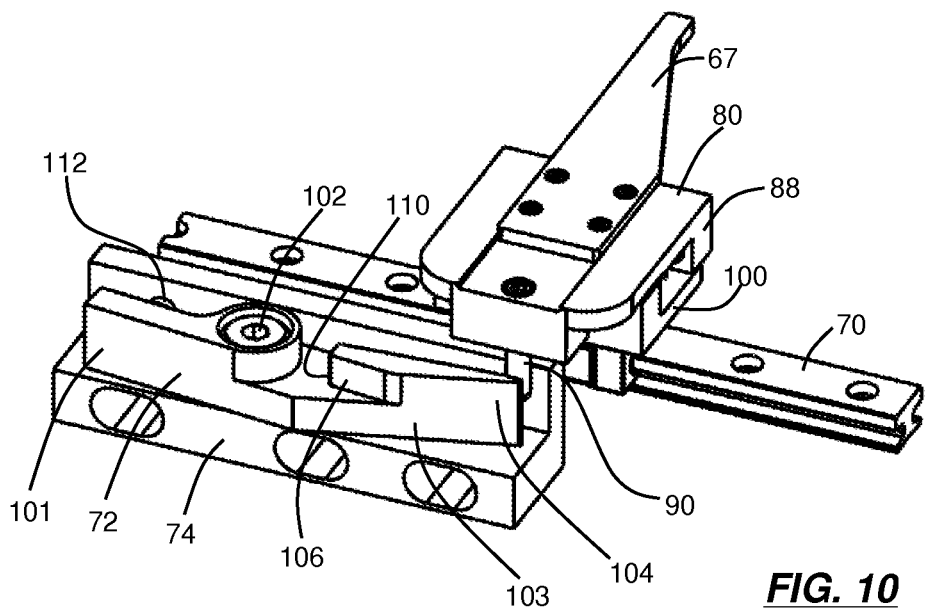
FIG. 10 is a perspective view of the second transfer finger assembly in a position advanced from its position shown in FIG. 9 nearing the end of the movement toward the adhesive picking station module.
Figure 11:
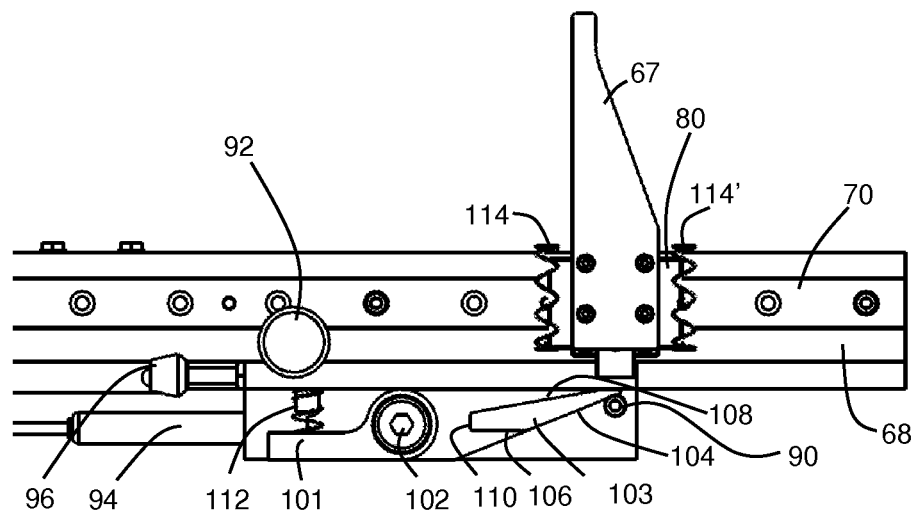
FIG. 11 is a plan view of the second transfer finger assembly initially returning to its home position.

Referring to FIG. 8, the second transfer finger assembly 80 and the flap cam control 72 are illustrated in detail. The second transfer finger assembly 80 includes an upper portion 98 and a lower portion 100. The lower portion 100 is fixedly associated with the reciprocating body 76 and thus moves along the long axis of the guide rail 70. The upper portion 98 moves slidably along the lower portion 100 in a direction transverse to the movement of the reciprocating body 76.

The flap cam control 72 includes an extension 101. The flap cam control 72 is pivotably attached to the flap base 74 by a pivot 102. The flap cam control 72 includes a cam 103 having a first surface 104, a second surface 106, a third surface 108, and an end surface 110. A spring 112 is disposed between the extension 101 and the flap base 74.

As illustrated in FIG. 8, the second transfer finger assembly 80 is shown in its home position with the guide pin 90 shown as being level with the end surface 110 of the flap cam control 72. In this position the hot part transfer finger 67 is directly behind the next heated bare bonding part as shown in FIG. 6.

With the movement of the reciprocating body 76 toward the adhesive picking station module 36 the guide pin 90 of the second transfer finger assembly 80 moves along the third beveled surface 108. This position is illustrated in top plan view in FIG. 9 and in perspective view in FIG. 10. At this point the heated bare bonding part is advanced to its tablet receiving position in the adhesive picking station module 36.

When the guide pin 90 has moved forward enough to clear the third surface 108 the spring 112 urges the extension 101 in rotation about the pivot 102 until third surface 108 of the cam 103 presses against the flap base 74.

After the hot part transfer finger 67 pushes the heated bare bonding part out of the oven module 32 to the adhesive picking station module 36 it is returned to its home position to engage the next heated bare bonding part in the oven module 32. Return of the reciprocating body 76 to its home position is assisted by the gas spring 94.

To accomplish this measure the hot part transfer finger 67 must be moved away from the array of bare bonding parts being heated in the oven module 32 toward the flap base 74. The rearward movement of the guide pin 90 along the first surface 104 acts to move the hot part transfer finger 67 out of engagement with the bare bonding parts. This movement is shown in the top plan view of FIG. 11 in which the guide pin 90 has initially engaged the first surface 104.

Figure 12:
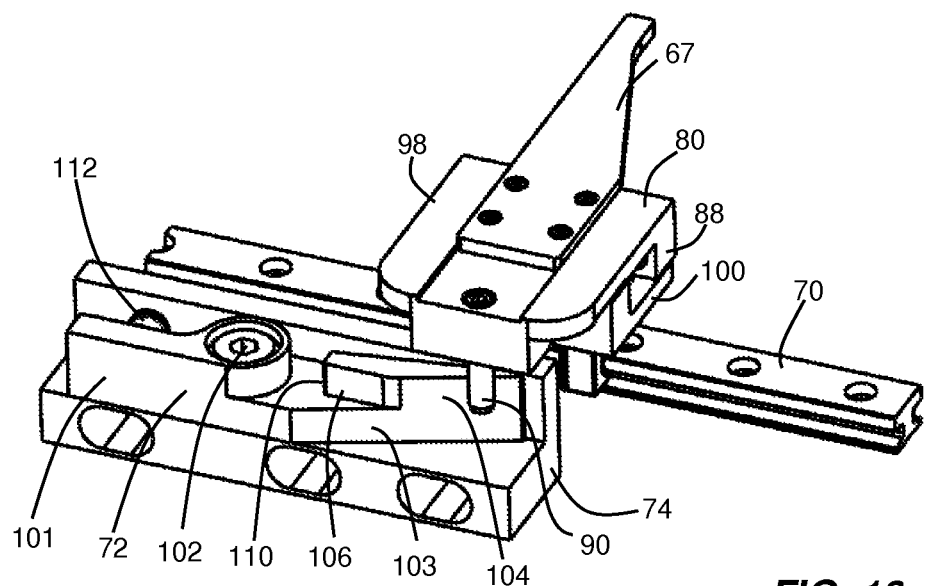
FIG. 12 is a perspective view of the second transfer finger assembly in a position advanced from its position shown in FIG. 11.
Figure 13:
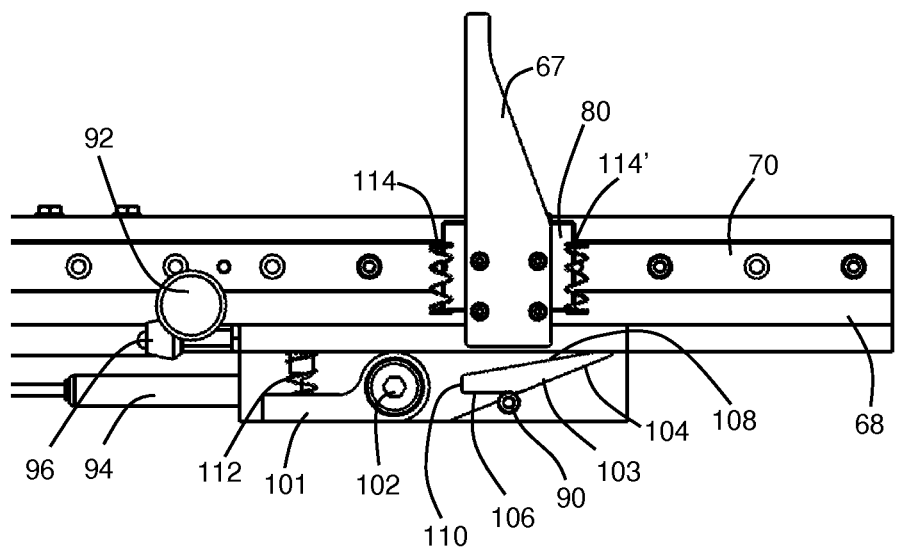
FIG. 13 is a plan view of the second transfer finger assembly in a position advanced from its position shown in FIG. 12.
Figure 14:
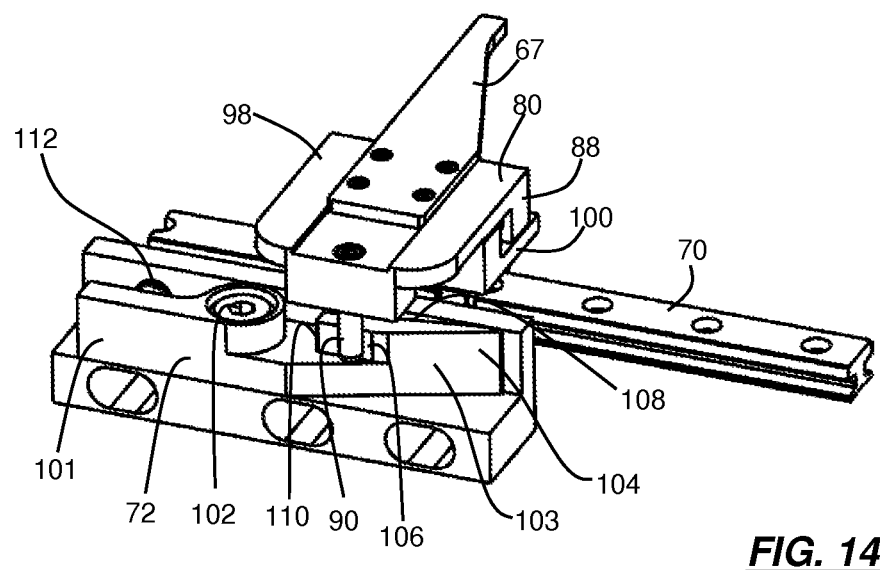
FIG. 14 is a perspective view of the second transfer finger assembly in a position advanced from its position shown in FIG. 13.

Further advancement of the reciprocating body 76 toward the loading station module 30 as shown in FIG. 12 forces the guide pin 90 to ride along the ramping first surface 104 of the cam 103, moving the upper portion 98 of the second transfer finger assembly 80 and thus the hot part transfer finger 67 further out of contact with the bare bonding part in the oven module 32. Eventually advancement of the reciprocating body 76 in this manner causes the guide pin 90 to reach the second surface 106 as shown in plan view in FIG. 13 and to move forward along the second surface 106 as shown in perspective view in FIG. 14. At this point the upper portion 98 and its associated hot part transfer finger 67 has moved as far as possible away from the array of bare bonding parts in the oven module 32.

Figure 15:
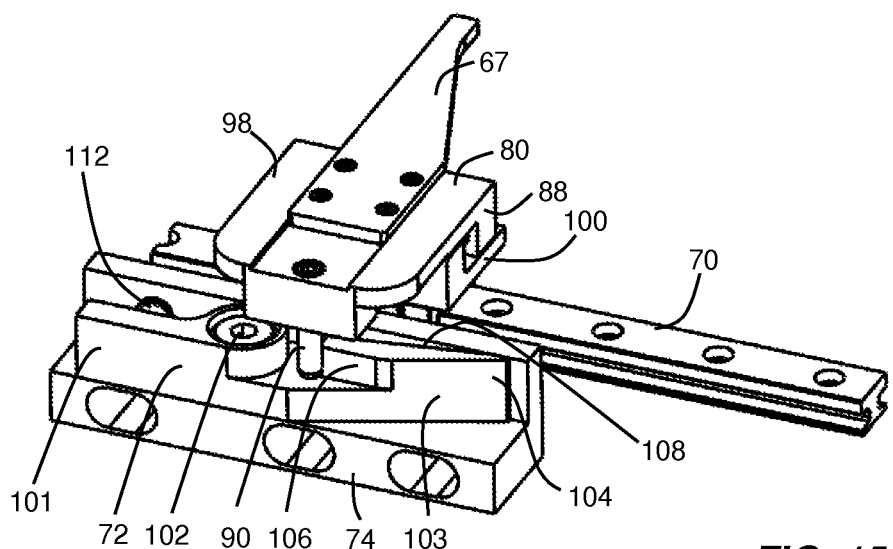
FIG. 15 is a perspective view of the second transfer finger assembly as it almost has returned to its home position.
Figure 16:
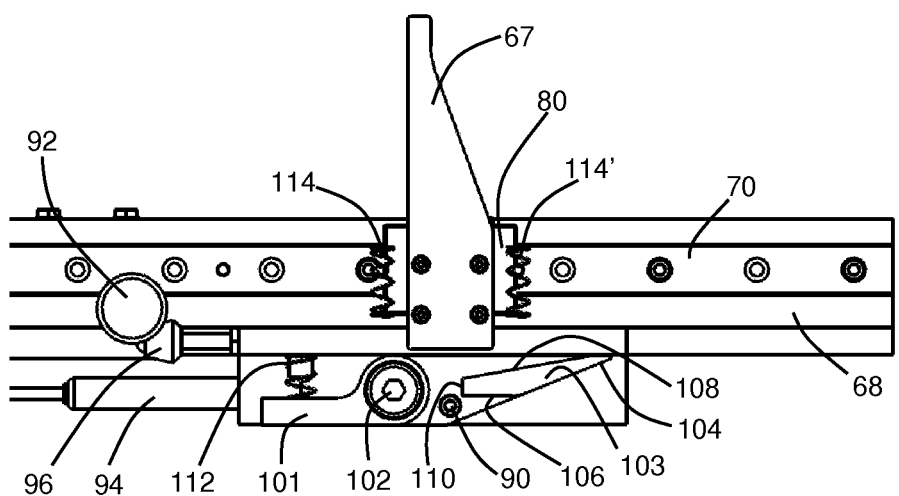
FIG. 16 is a plan view of the arrangement of FIG. 15.

Eventually, and as illustrated in FIGS. 15 and 16, advancement of the reciprocating body 76 toward the loading station module 30 brings the guide pin 90 to the point at which the upper portion 98 of the second transfer finger assembly 80 is about to snap back to its home position of FIG. 8 where the hot part transfer finger 67 is positioned behind the next heated bare bonding part. The snapping movement of the upper portion 98 of the second transfer finger assembly 80 is effected by a pair of biasing members 114 and 114'. Movement of the reciprocating body 76 toward its home position is stopped by the extended position of the gas spring 94.

Adhesive Picking Station Module

The adhesive picking station module 36 is illustrated in detail in FIGS. 17 through 29. In general, the adhesive picking station module 36 provides a supply of adhesive and a method of transferring tablets one at a time to a station where it is joined to a heated bare bonding part.

Figure 17:
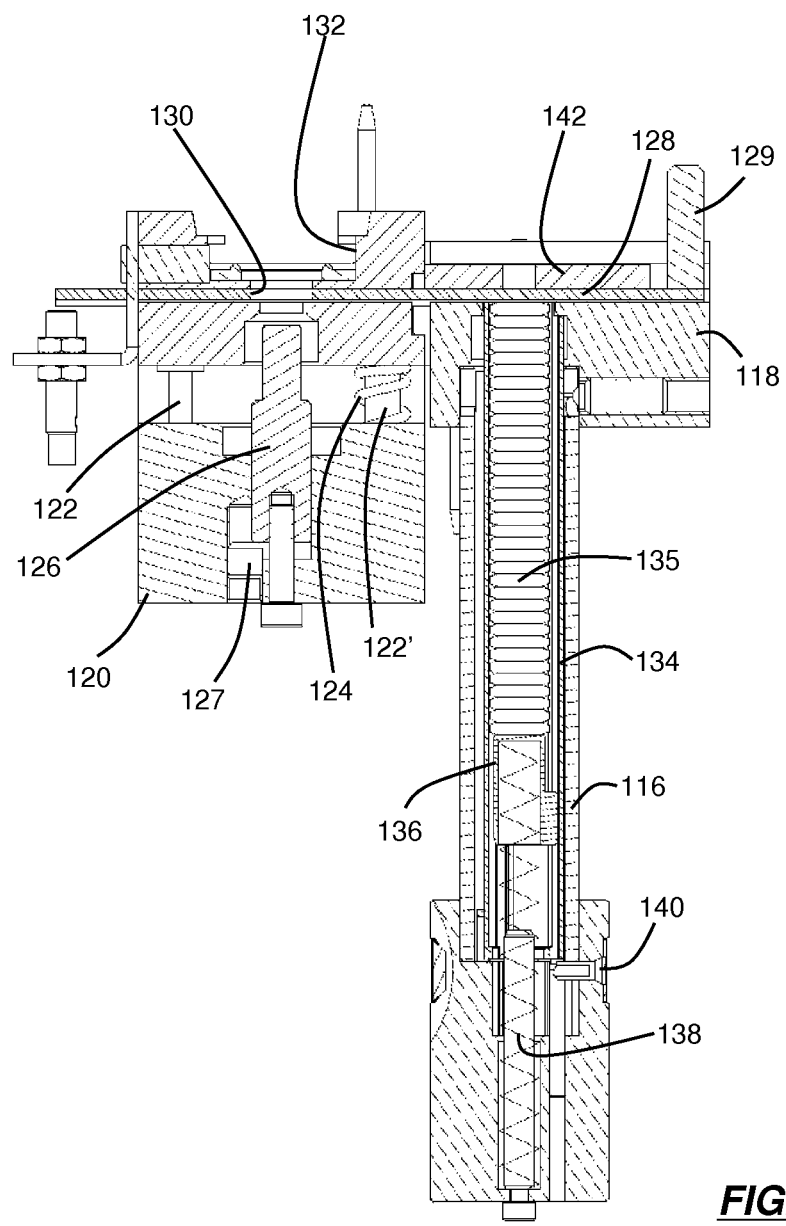
FIG. 17 is sectional view of the adhesive picking station module.
Figure 23:
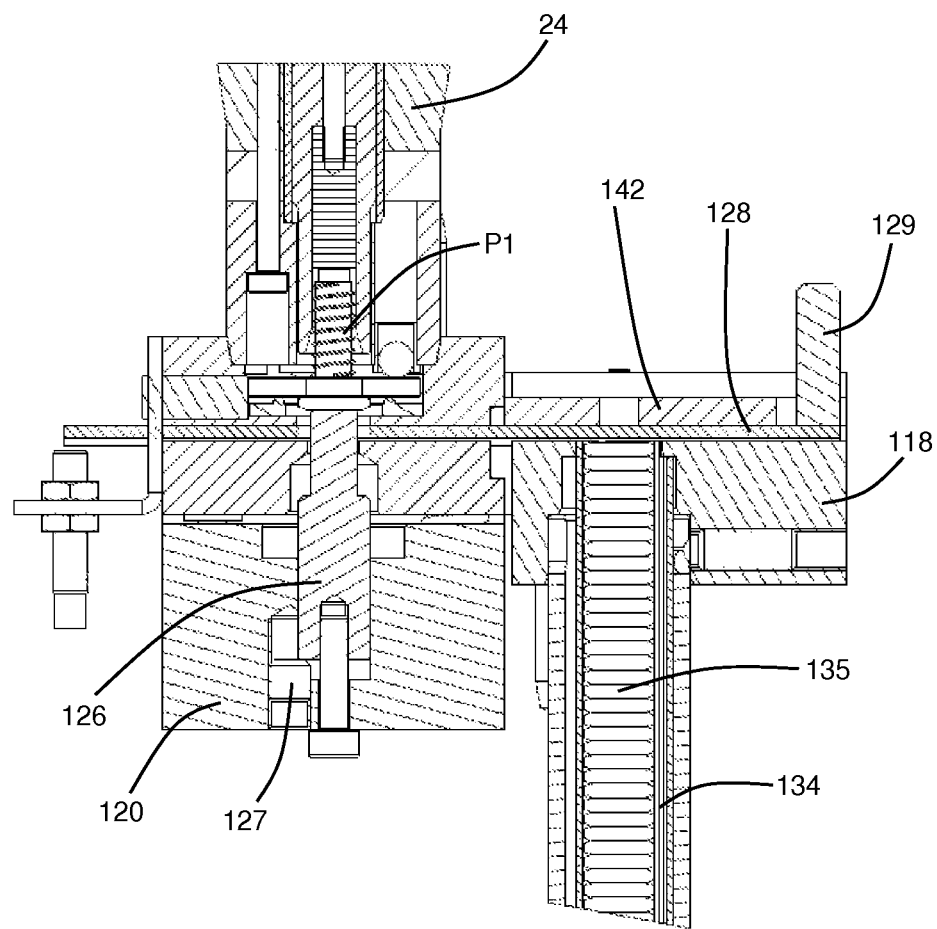
FIG. 23 illustrates the applicator and heated bare bonding part pressing the movable picking station base against the fixed picking station base and showing the adhesive tablet captured between the heated bare bonding part and the stamp.

Referring to FIG. 17, the adhesive picking station module 36 is shown in section. The adhesive picking station module 36 includes a tablet magazine 116 releasably attached to a movable picking station base 118. The movable picking station base 118 is slidably attached to a fixed picking station base 120 that is attached to the base plate 38. A pair of guide shafts 122 and 122' align and connect the movable picking station base 118 to the fixed picking station base 120. A biasing member 124 urges the movable picking station base 118 apart from the fixed picking station base 120. A tablet stamp 126 is fitted to the fixed picking station base 120. An adjustment screw 127 is provided for fine adjustment of the tablet stamp 126. (The adjustment screw 127 is provided to allow fine adjustment of the height of the tablet stamp 126 so as to allow the correct contact between the hot bonding part $P_1$ and the adhesive tablet when it is picked up as shown in FIG. 23, discussed below.)

A movable adhesive tablet slide 128 is reciprocatingly fixed to the top of the movable picking station base 118. The movable adhesive tablet slide 128 has a handle 129 and a tablet holding hole 130 formed therein. Generally above the movable adhesive tablet slide 128 is a heated bare bonding part receiver 132.

The tablet magazine 116 is releasably attached to the underside of the movable picking station base 118 preferably by a bayonet-type mount as is known in the art. Within the tablet magazine 116 is an adhesive tablet cartridge 134. The adhesive tablet cartridge 134 may hold any number of adhesive tablets 135 such as fifty and may be replaced with a full cartridge when empty. It is to be understood that while the adhesive tablet cartridge 134 is illustrated other tablet feeders, such as a ball feeder [not shown], may be used.

A reciprocating piston 136 is attached to the base of the tablet magazine 116 by a biasing member 138. The reciprocating piston 136 is preferably a bright color, such as red, to allow for easy visualization by the operator as discussed further below. The biasing member 138 urges the reciprocating piston 136 upward against the lowermost adhesive tablet 135. A locking pin assembly 140 is fitted to the lowermost portion of the tablet magazine 116 for retaining the reciprocating piston 136 in a lowered locked position to allow replacement of the adhesive tablet cartridge 134 as will be explained in detail below.

Figure 18:
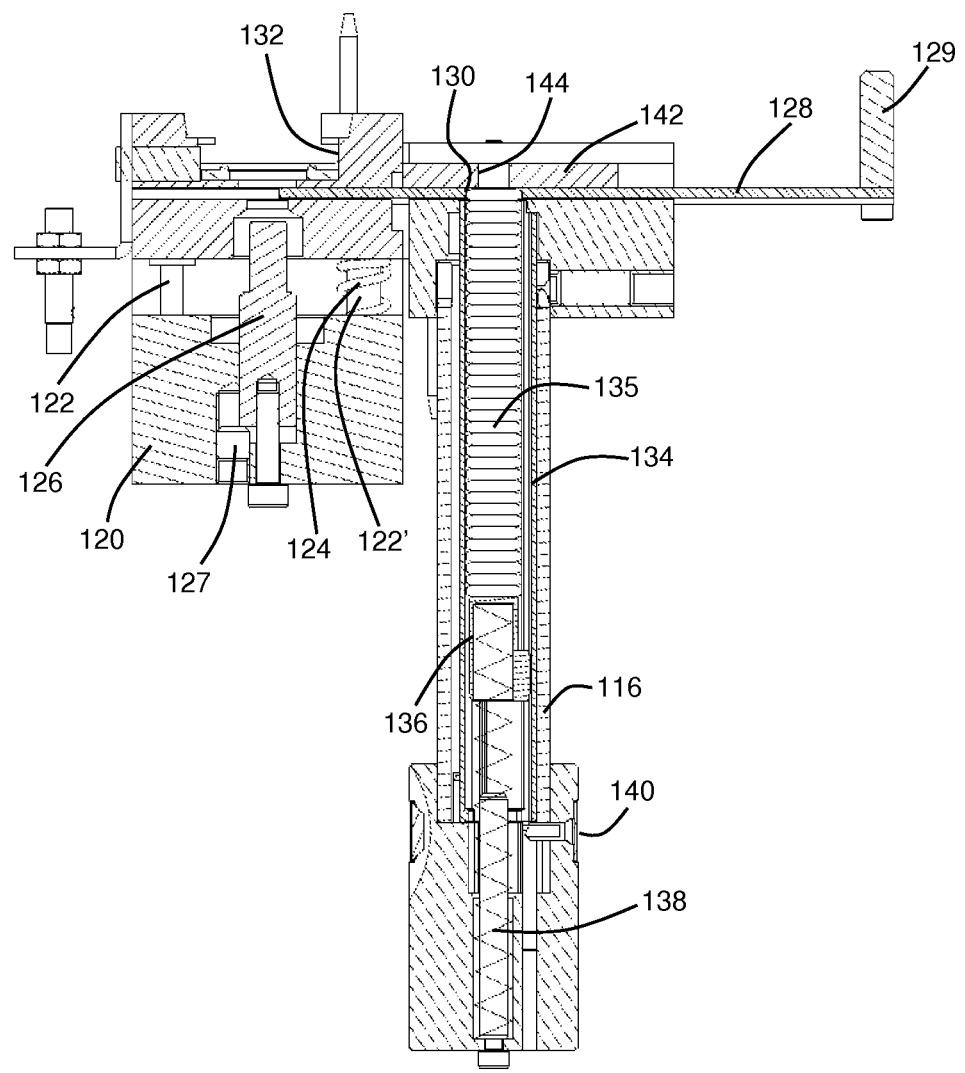
FIG. 18 illustrates the adhesive picking station module of FIG. 17 showing the adhesive tablet being loaded into the slide.

FIG. 18 illustrates the adhesive picking station module 36 in its adhesive tablet loading position. As shown, the movable adhesive tablet slide 128 has been moved to its tablet receiving position with the tablet holding hole 130 positioned above the adhesive tablets 135. A transparent tablet movement-limiting plate 142 having a pin-passing aperture 144 formed therein limits upward movement of the uppermost tablet 135 such that only a single tablet at a time may be moved into the tablet holding hole 130.

Figure 19:
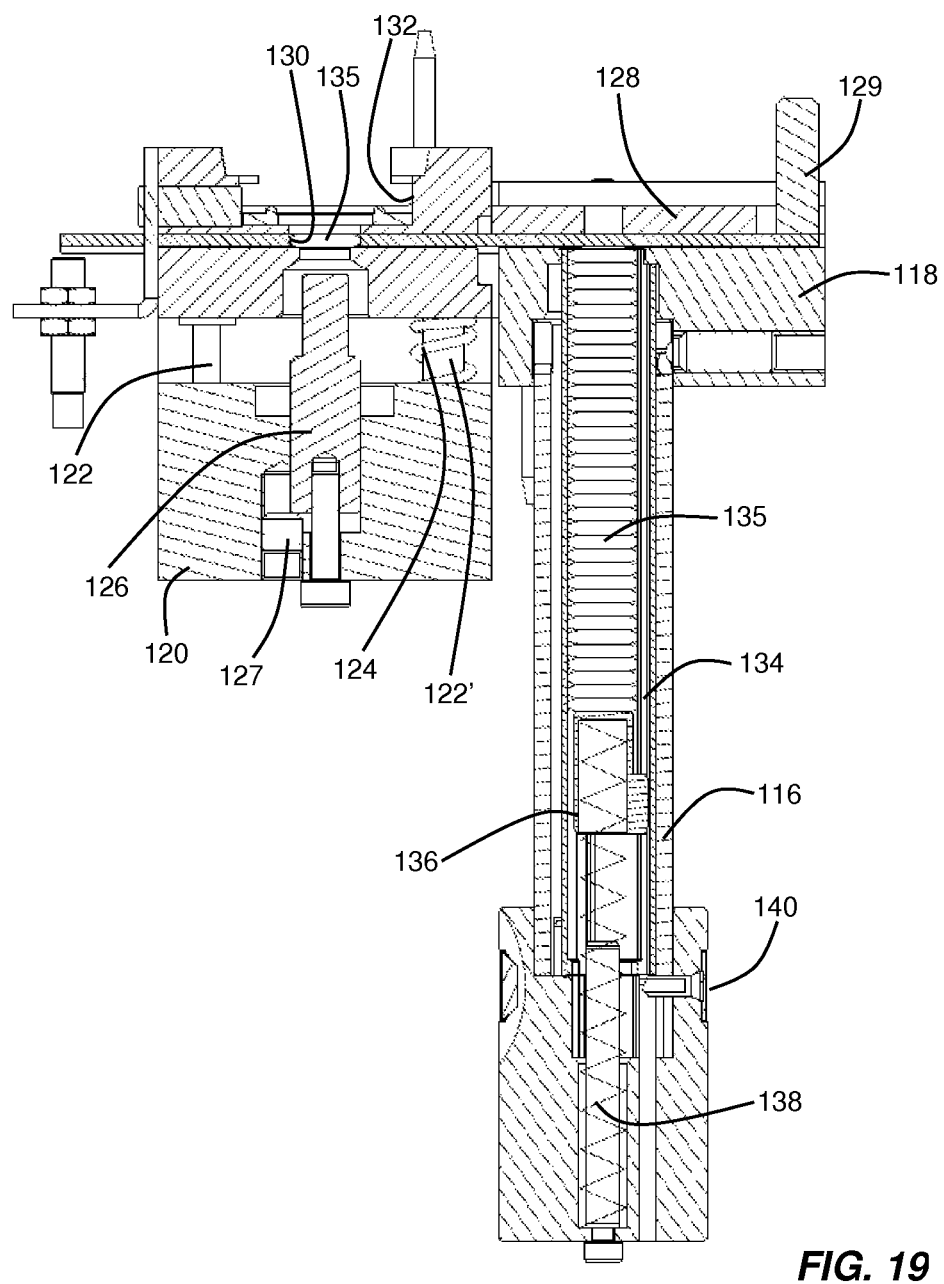
FIG. 19 illustrates the adhesive picking station module of FIG. 17 showing the adhesive tablet in place for attachment to the heated bare bonding part.
Figure 20:
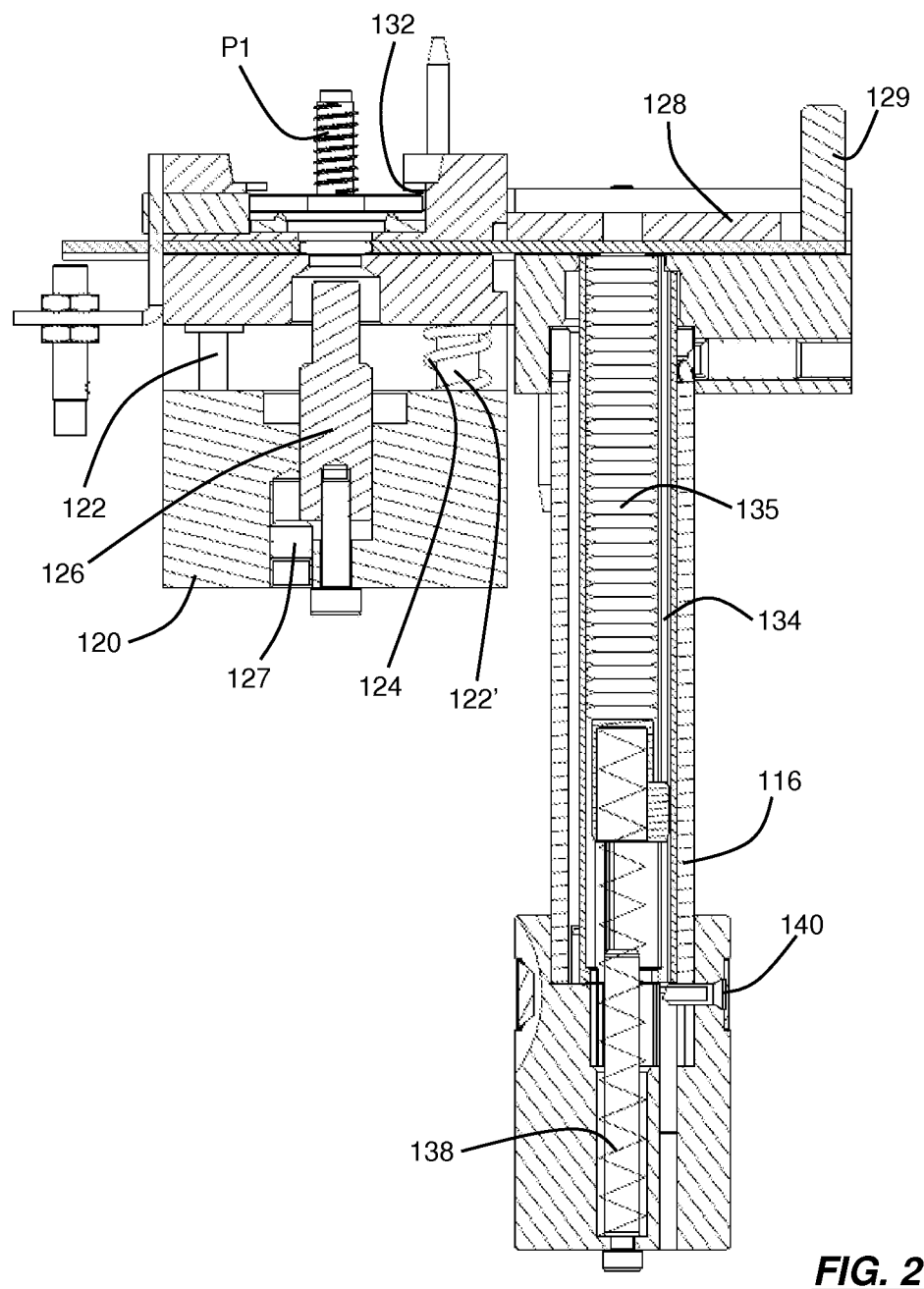
FIG. 20 illustrates the adhesive picking station module of FIG. 17 showing the heated bare bonding part in position above the adhesive tablet.

Once an adhesive tablet 135 is positioned in the tablet holding hole 130 the movable adhesive tablet slide 128 is moved into position above the tablet stamp 126 by an operator using the handle 129. This positioning is illustrated in FIG. 19. Thereafter, and as shown in FIG. 20, a heated bare bonding part $P_1$ is moved in position in the heated bare bonding part receiver 132 through measures described above with respect to the description of the part slide module 34.

Figure 21:
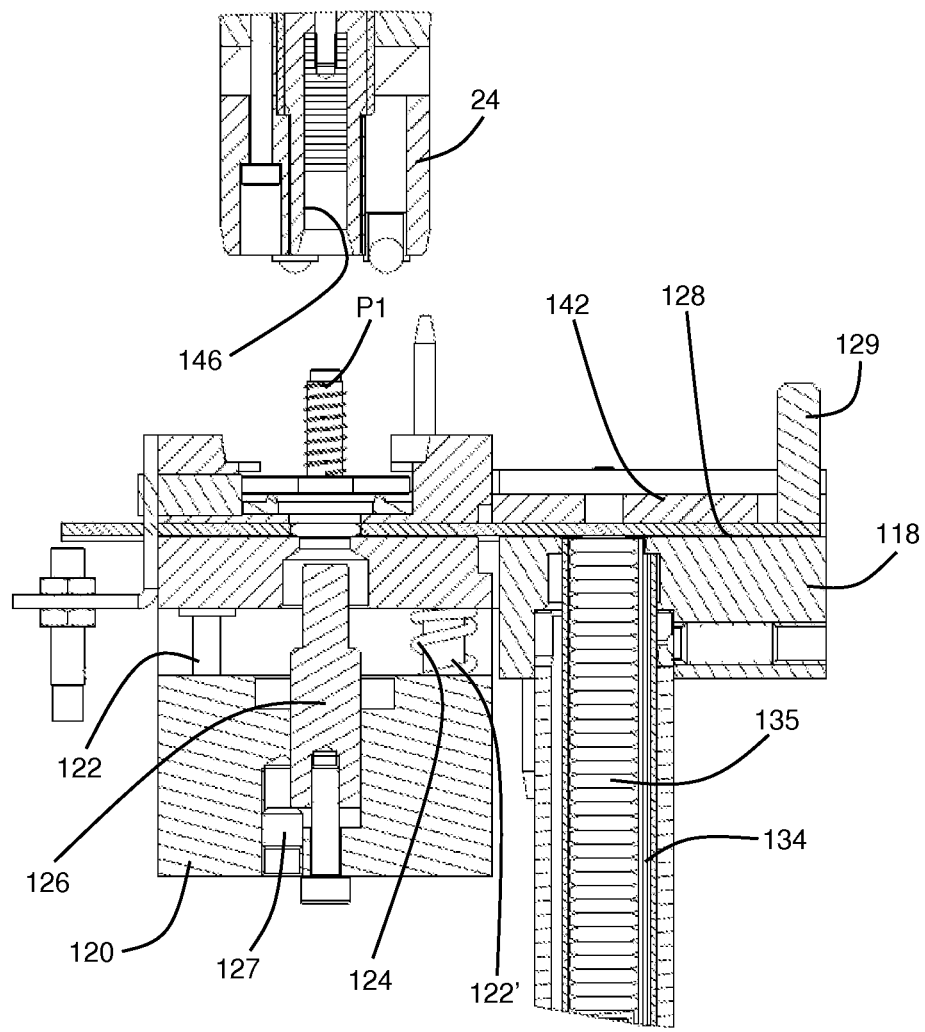
FIG. 21 illustrates the applicator in position above the heated bare bonding part in anticipation of attachment thereto.
Figure 22:
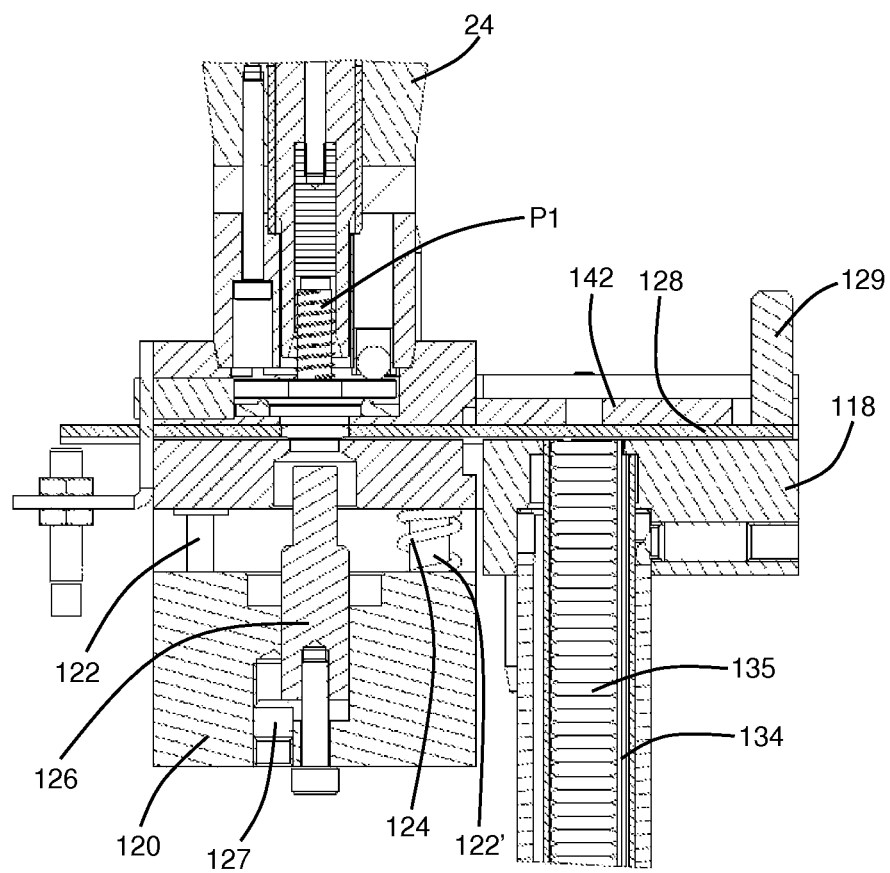
FIG. 22 illustrates the applicator connected to the heated bare bonding part.

When the heated bare bonding part $P_1$ is moved into position above the adhesive tablet 135 the operator positions the applicator 24 above the heated bare bonding part $P_1$ as shown in FIG. 21. The applicator 24 includes a bonding part receiving and holding aperture 146. Once in position, the operator moves the applicator 24 onto the heated bare bonding part $P_1$ until the stud of the heated bare bonding part $P_1$ is fitted into the bonding part receiving and holding aperture 146 as illustrated in FIG. 22. The operator then pushes down on the applicator 24 that moves the movable picking station base 118 downward against the fixed picking station base 120. Eventually downward movement of the applicator 24 toward the fixed picking station base 120 causes the underside of the heated bare bonding part $P_1$ to come into contact with the upper side of the adhesive tablet 135. The lower side of the adhesive tablet 135 ultimately contacts the stamp 126 and the adhesive tablet 135 is captured there between as shown in FIG. 23.

Figure 24:
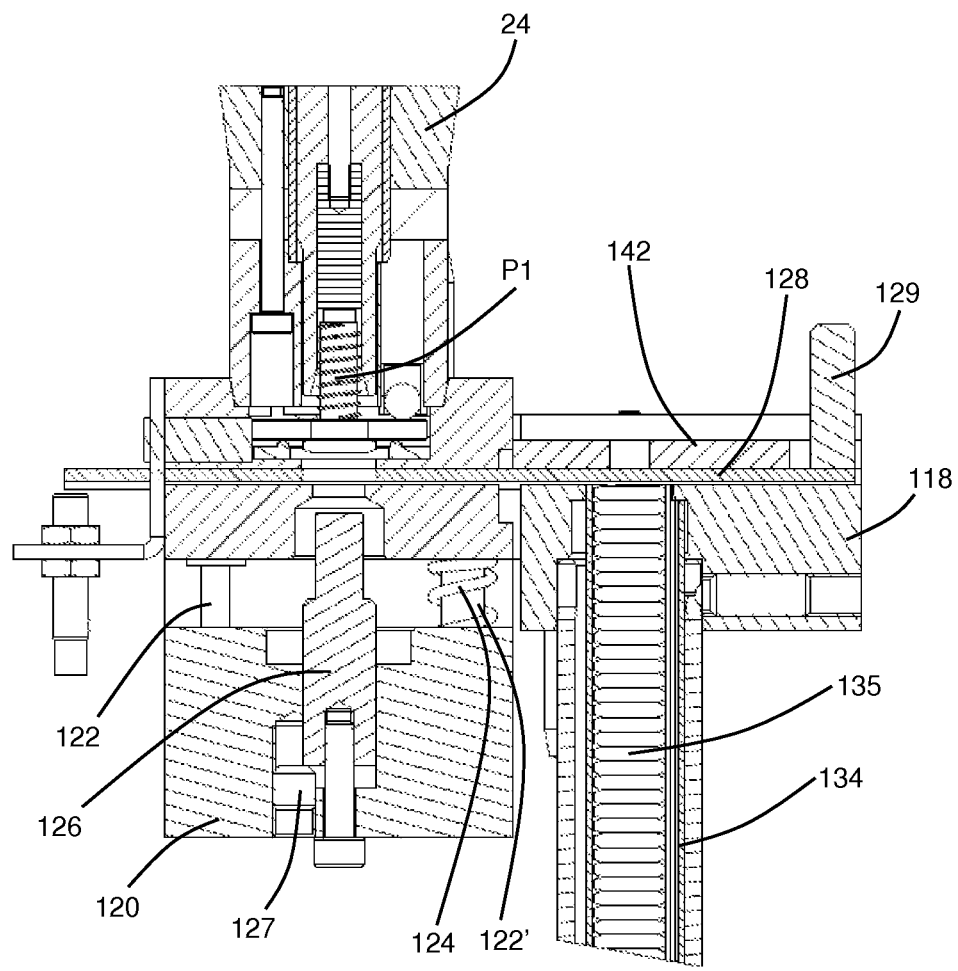
FIG. 24 illustrates the movable picking station base urged away from the fixed picking station base.
Figure 25:
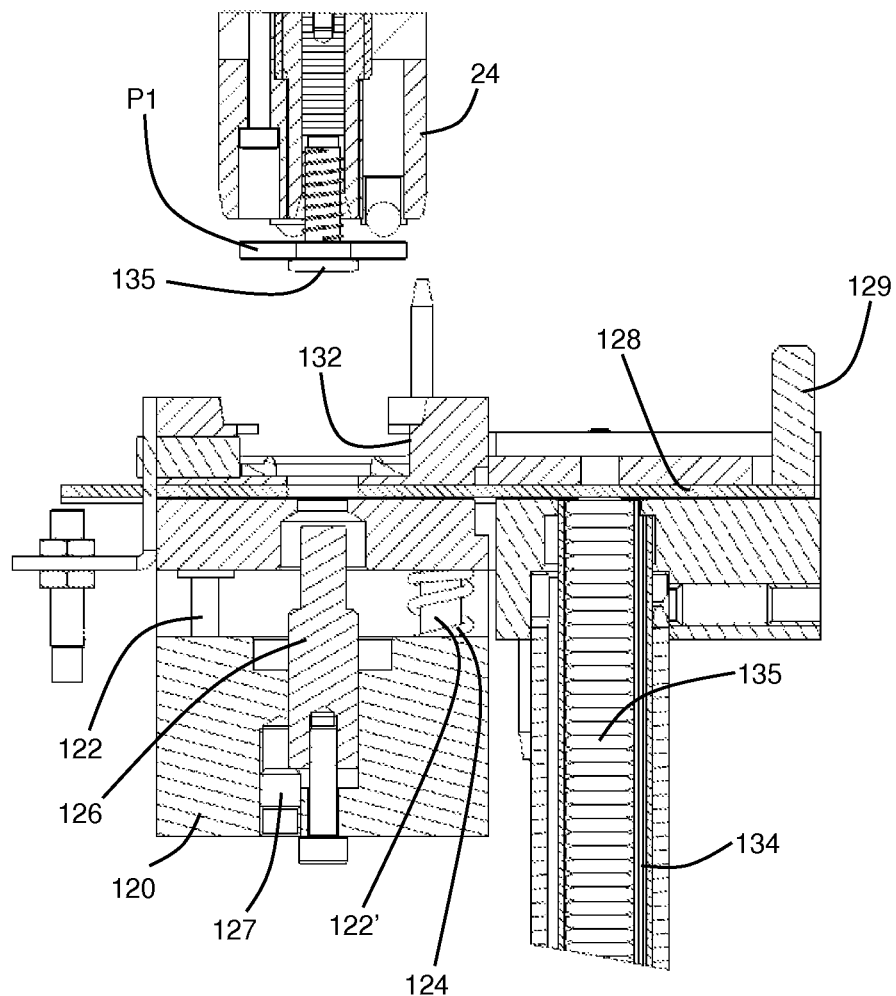
FIG. 25 illustrates the applicator and adhesive-picked bonding part removed from the adhesive picking station module.

Once the adhesive tablet 135 is adhered to the heated bare bonding part $P_1$ the operator moves the applicator 24 upward as shown in FIG. 24. With the downward pressure on the applicator 24 relieved the movable picking station base 118 is urged by the biasing member 124 to its resting position relative to the fixed picking station base 120. The applicator 24 is then completely removed from the adhesive picking station module 36, as illustrated in FIG. 25, for adhesion to a selected substrate.

Figure 26:
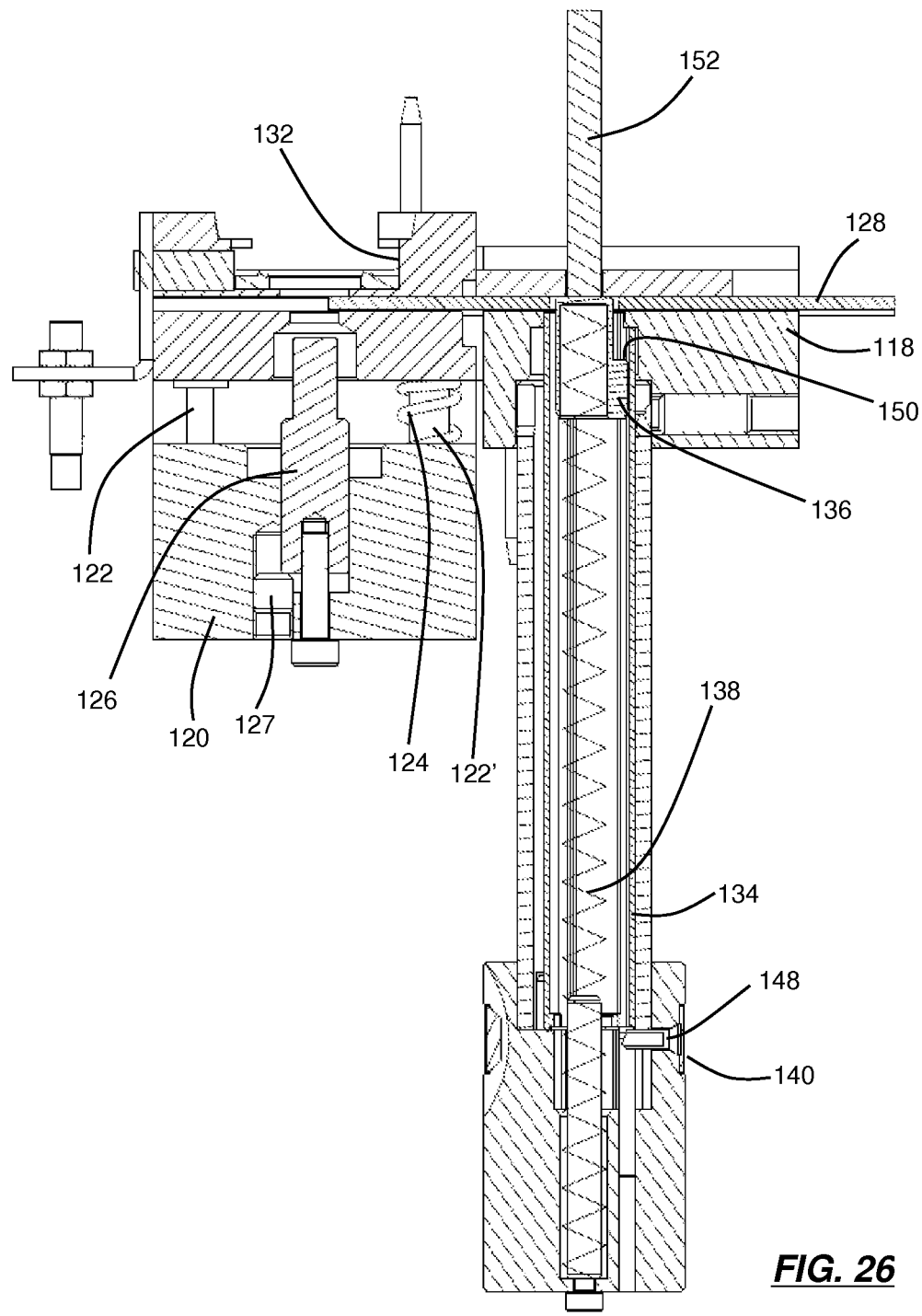
FIG. 26 illustrates the insertion of a pin into an empty tablet magazine to push the reciprocating piston into a locked release position.

After the operations described above are repeated the adhesive tablet cartridge 134 will eventually become empty as illustrated in FIG. 26. On this occasion it is necessary to remove the adhesive tablet cartridge 134 from the tablet magazine 116. To allow for the removal of the adhesive tablet cartridge 134 the locking pin assembly 140 is provided to lock the reciprocating piston 136 into a cartridge-releasing position. The locking pin assembly 140 includes a spring loaded piston locking pin 148 reciprocatingly positioned in the wall of the tablet magazine 116. A biasing member is provided to urge the piston locking pin 148 inward. The reciprocating piston 136 includes a locking pin-engaging shoulder 150.

Figure 27:
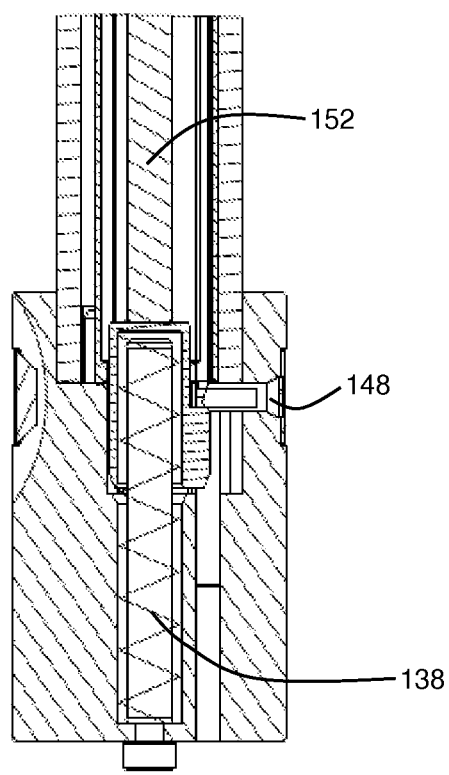
FIG. 27 illustrates the reciprocating piston locked in position by the locking pin.

Before the tablet magazine 116 can be removed from the movable picking station base 118 the pressure upon the reciprocating piston 136 exerted by the biasing member 138 must be relieved. To accomplish this, and as illustrated in FIG. 26, a pin 152 is inserted into the pin-passing aperture 144 of the transparent tablet movement-limiting plate 142. Downward pressure is applied upon the reciprocating piston 136 by the operator using the pin 152 until the inner end of the piston locking pin 148 engages the locking pin-engaging shoulder 150 of the reciprocating piston 136. Thus engaged the reciprocating piston 136 is locked in place toward the lower end of the tablet magazine 116. This is illustrated in FIG. 27.

Figure 28:
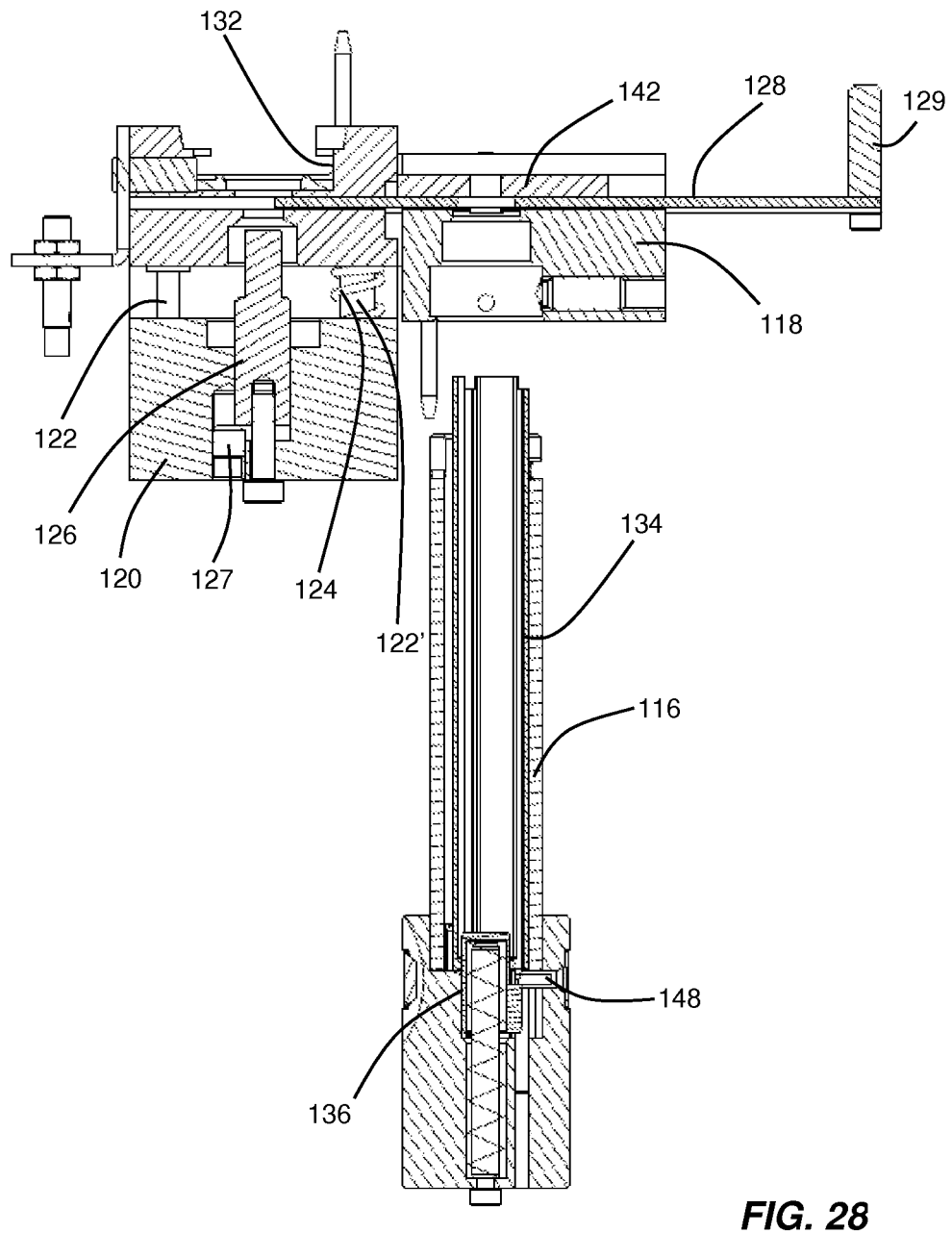
FIG. 28 illustrates the empty tablet magazine separated from the rest of the adhesive picking station module.
Figure 29:
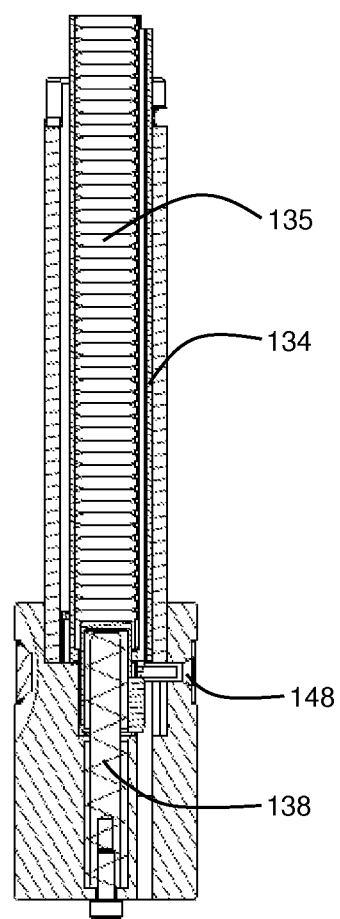
FIG. 29 illustrates a tablet magazine containing a replacement tablet cartridge.

Once the reciprocating piston 136 is locked into its lower position the tablet magazine 116 can be released from the underside of the movable picking station base 118 by a twisting movement. The removed tablet magazine 116 is shown in FIG. 28 relative to the adhesive picking station module 36. Thereafter, and as shown in FIG. 29, a filled adhesive tablet cartridge 134 is inserted into the tablet magazine 116 which is thereafter ready for reattachment to the movable picking station base 118. The operator can start the tablet loading with the adhesive tablet slide 128 after releasing the spring loaded piston locking pin 148 whereupon the biasing member 138 urges the reciprocating piston 136 upward against the lowermost adhesive tablet 135.

Tool Operation

Before operation, the operator verifies that there are a sufficient number of adhesive tablets 135 in the adhesive tablet cartridge 134 to perform the required number of operations. This can be done by any of several methods. One method is for the operator to confirm the presence of the upper tablet by looking through the transparent tablet movement-limiting plate 142. If there is no tablet in the cartridge the brightly-colored reciprocating piston 136 would be visible. In such case the operator would then lock the movable adhesive tablet slide 128 mechanically when the movable adhesive tablet slide 128 has been moved to its tablet receiving position and the brightly-colored reciprocating piston 136 would snap into the tablet holding hole 130 positioned above the adhesive tablet cartridge 134. This step includes the removal and inspection of the adhesive tablet cartridge 134, by visual verification in the event that the tablet magazine 116 and the adhesive tablet cartridge 134 have visualization windows, or by an indicator such as a visible mark in the form of, for example, a red line, or a line or a level marking on the pin 152.

Once the presence of a sufficient number of adhesive tablets 135 has been verified, the bonding tool 10 is first attached to a suitable electric power source and is switched on at a main switch (not shown). All of the indicator lights 153, 154, and 155 (which may be the same color or different colors) are turned on and the reciprocating body 76 of the part slide module 34 is locked on the guide rail 70. After the oven module 32 achieves a pre-selected internal temperature the indicator light 153 changes from a first color to a second color (such as from red to green). If at any time during operation of the bonding tool the internal temperature of the oven module 32 falls below the pre-selected temperature the indicator light 153 returns to its original color (such as going from green back to red). At any time while the bonding tool 10 is turned on the indicator lights 153, 154, and 155 are turned from a first color to a second color (again, such as from red to green). Only when all three indicator lights are the second color (such as green) can the reciprocating body 76 of the part slide module 34 be unlocked and the part transfer can be initiated.

The operator then moves the movable adhesive tablet slide 128 so that the tablet holding hole 130 is above the adhesive tablet cartridge 134 thus allowing a single adhesive tablet 135 enter the tablet holding hole 130. The operator then slides the movable adhesive tablet slide 128 inward until the single adhesive tablet 135 is positioned above the tablet stamp 126. In this position the indicator light 154 changes from its first color to its second color (such as from red to green).

The operator then places the base of an unheated bare bonding part into the circular receiver 48 of the support block 42 of the loading station module 30. The magnet 49 pulls down the unheated bare bonding part into proper position and the indicator light 155 changes from its first color to its second color (such as from red to green).

When all of the indicator lights 153, 154, and 155 are changed to their second color (such as green) the reciprocating body 76 of the part slide module 34 is unlocked and the operator moves the handle 92 of the reciprocating body 76 to move the unheated bare bonding part $P_5$ from the loading station module 30 into the oven module 32 as discussed above. Simultaneously a heated bare bonding part $P_1$ exits the oven module 32 and is placed on the heated bare bonding part receiver 132 of the adhesive picking station module 36 also as described above. The reciprocating body 76 moves back to its home position assisted by the gas spring 94.

With a heated bare bonding part in position on the adhesive picking station module 36, the operator presses the applicator 24 onto the stud of the heated bare bonding part as set forth above. Sufficient pressure is applied by the operator on the applicator 24 so that the adhesive tablet 135 is captured between the underside of the heated bare bonding part $P_1$ and the tablet stamp 126, causing the adhesive tablet 135 to adhere to the underside of the heated bare bonding part $P_1$. Signals may be provided to inform the operator when the applicator 24 with the adhesive-fitted bonding part may be removed from the adhesive picking station module 36 and to inform the operator when the applicator 24 has been held in position too long. After removal of the applicator 24 from the picking station, the indicator lights 153, 154 and 155 turn their starting color (such as red) and the reciprocating body 76 of the part slide module 34 is locked. The operator then positions the adhesive-fitted bonding part to the selected substrate.

Additional operation indicators on the applicator 24 may be added such as a colored LED which shows the time to wait before the application to be sure the adhesive is melted enough ("waiting time"), and four other colored count-down LEDs which inform the operator of the ready status and the time range of the bonding part to be applied on the substrate ("application time range").

The foregoing discussion discloses and describes exemplary embodiments of the present invention. One skilled in the art will readily recognize from such discussion, and from the accompanying drawings and claims that various changes, modifications and variations can be made therein without departing from the true spirit and fair scope of the invention as defined by the following claims.

What is claimed is:

1. A bonding tool to attach an adhesive element to a bonding part comprising:
   a loading station module for receiving an unheated bonding part;
   an oven module for receiving and heating the unheated bonding part;
   an adhesive picking station module for attachment of the adhesive element to the heated bonding part;
   a part slide module for selectively and sequentially advancing the bonding part from said loading station module, into and through said oven module, and to said adhesive picking station module, said part slide module including a guide base attached to said bonding tool base, a guide rail attached to said guide base, and a reciprocating body movably attached to said guide rail;
   a bonding tool base to which said loading station module, said oven module, said adhesive picking station module, and said part slide module are fitted;
   a flap cam control and a flap base, said flap cam control being pivotably mounted on said flap base;
   a first transfer finger assembly for moving the unheated bare bonding part from said loading station into said oven module; and
   a second transfer finger assembly for moving the heated bare bonding tool from said oven module to said adhesive picking station module, said second transfer finger assembly including a hot part transfer finger attached to a reciprocating finger support having a guide pin extending there from for contacting said flap cam control, said guide rail having a long axis, said reciprocating finger support being movable in a direction transverse to said long axis of said guide rail.

2. The bonding tool of claim 1 wherein said loading station module includes a receiver for receiving and temporarily holding the unheated bare bonding part, a finger slot continuous with said receiver, and a bonding part channel continuous with said receiver.

3. The bonding tool of claim 2 wherein said receiver of said loading station module includes a magnet for holding the unheated bare bonding part.

4. The bonding tool of claim 1 wherein said oven module includes a heating block having a bonding part channel formed therein.

5. The bonding tool of claim 4 wherein said heating block includes at least one heating element.

6. The bonding tool of claim 5 wherein said oven module includes an oven module cover.

7. The bonding tool of claim 1 wherein said adhesive picking station module includes a fixed picking station base attached to said bonding tool base.

8. The bonding tool of claim 7 further including a movable picking station base movably attached to said fixed picking station base.

9. The bonding tool of claim 8 further including a tablet magazine releasably attached to said movable picking station base.

10. The bonding tool of claim 9 wherein said tablet magazine includes a replaceable adhesive tablet cartridge.

11. The bonding tool of claim 10 wherein said replaceable adhesive cartridge includes a reciprocating piston and a biasing element attached to said reciprocating piston.

12. The bonding tool of claim 8 further including a movable adhesive tablet slide having a tablet holding hole formed therein.

13. The bonding tool of claim 1 further including a plurality of removable protective covers.

14. The bonding tool of claim 7 further including a tablet stamp movably fitted to said fixed picking station base and an adjustment screw for fine adjustment of said tablet stamp.

15. A bonding tool to attach an adhesive element to a bonding part comprising:
   a loading station module for receiving an unheated bonding part;
   an oven module for receiving and heating the unheated bonding part;
   an adhesive picking station module for attachment of the adhesive element to the heated bonding part;
   a part slide module for selectively and sequentially advancing the bonding part from said loading station module, into and through said oven module, and to said adhesive picking station module, said part slide module including a guide base attached to said bonding tool base, a guide rail attached to said guide base, said guide rail having a long axis;
   a first transfer finger assembly for moving the unheated bare bonding part from said loading station into said oven module; and
   a second transfer finger assembly for moving the heated bare bonding tool from said oven module to said adhesive picking station module, said second transfer finger assembly including a hot part transfer finger attached to a reciprocating finger support having a guide pin extending therefrom, said reciprocating finger support being movable in a direction transverse to said long axis of said guide rail.

16. The bonding tool of claim 15 wherein said loading station module includes a receiver for receiving and temporarily holding the unheated bare bonding part, a finger slot continuous with said receiver, and a bonding part channel continuous with said receiver.

17. The bonding tool of claim 16 wherein said receiver of said loading station module includes a magnet for holding the unheated bare bonding part.

18. The bonding tool of claim 15 wherein said oven module includes a heating block having a bonding part channel formed therein.

19. The bonding tool of claim 15 further including a bonding tool base to which said loading station module, said oven module, said adhesive picking station module, and said part slide module are fitted and wherein said adhesive picking station module includes a fixed picking station base attached to said bonding tool base.

20. The bonding tool of claim 19 further including a movable picking station base movably attached to said fixed picking station base.

21. The bonding tool of claim 20 further including a tablet magazine releasably attached to said movable picking station base.

22. The bonding tool of claim 21 wherein said tablet magazine includes a replaceable adhesive tablet cartridge, said replaceable adhesive cartridge including a reciprocating piston and a biasing element attached to said reciprocating piston.

23. The bonding tool of claim 15 further including a movable adhesive tablet slide having a tablet holding hole formed therein.

24. The bonding tool of claim 15 further including a flap cam control and a flap base, said flap cam control being pivotably mounted on said flap base.

25. The bonding tool of claim 19 further including a tablet stamp movably fitted to said fixed picking station base and an adjustment screw for fine adjustment of said tablet stamp.

* * * * *